United States Patent Office 2,763,677
Patented Sept. 18, 1956

2,763,677

PROCESS FOR MAKING MONOMERIC α-CYANOACRYLATES

Charles G. Jeremias, Kingsport, Tenn., assignor to Eastman Kodak Company, Rochester, N. Y., a corporation of New Jersey No Drawing. Application December 20, 1954,
Serial No. 476,575

10 Claims. (Cl. 260—465.4)

This invention relates to the preparation of monomeric α-cyanoacrylates and is particularly concerned with the preparation in improved yield of monomeric α-cyanoacrylates useful as adhesive compositions.

The monomeric form of an α-cyanoacrylate is usually prepared by the depolymerization of a polymer thereof which is formed by reacting a cyanoacetate with formaldehyde or a polymer of formaldehyde in the presence of a basic condensation catalyst. In the early methods of preparing the α-cyanoacrylates, the reaction between the cyanoacetate and the formaldehyde was effected in aqueous medium, usually by employing an aqueous solution of formaldehyde. This type of process was discussed in Ardis U. S. Patent 2,467,927. The monomeric α-cyanoacrylates are readily polymerizable without the use of either heat or a catalyst, and it has consequently been difficult to store the monomer without premature polymerization. This was particularly true with the monomeric α-cyanoacrylates prepared from polymer made in aqueous medium, since the presence of even small amounts of water catalyzes the polymerization reaction and hence contributes to the instability of the monomer. In the processes using an aqueous medium, it was difficult to reduce the moisture content of the polymeric α-cyanoacrylates to a sufficiently low level prior to depolymerization to give monomers having good stability in bulk at room temperature. Furthermore, the presence of even small amounts of moisture made the depolymerization reaction difficult to perform because of the elevated temperatures which were necessary to effect the depolymerization.

An improved process for preparing the monomers was disclosed in the copending application of Joyner and Hawkins, Serial No. 415,422, filed March 10, 1954, now Patent No. 2,721,858. In this process, the reaction between the cyanoacetate and the formaldehyde is effected in solution in a nonaqueous organic solvent which distills below the depolymerization temperature of the polymeric α-cyanoacrylate formed during the reaction. The water which is formed during the reaction is azeotropically separated from the reaction mixture before depolymerization. This was readily accomplished by using an azeotroping solvent, such as benzene and the like, as the reaction vehicle or by adding an azeotroping solvent to the reaction mixture following the reaction. The polymers obtained by azeotropic removal of the water contained a very low level of moisture content and could be readily depolymerized to give α-cyanoacrylate monomer which had greatly improved stability because of the absence of any substantial amount of water.

This invention is concerned with further improving this latter process wherein the reaction is effected in nonaqueous medium, and the water is azeotropically removed. In particular, the present invention provides a method whereby the yield of crude monomer is almost quantitative, and the depolymerization is more easily effected than with the Joyner and Hawkins process.

It is accordingly an object of this invention to provide a new and improved process for preparing monomeric α-cyanoacrylates, and it is particularly an object of this invention to improve the process wherein monomeric α-cyanoacrylate is prepared by reacting a cyanoacetate and formaldehyde in nonaqueous medium and wherein the water formed during the reaction is azeotropically removed prior to depolymerization.

Other objects will be apparent from the description and claims which follow.

I have found that the preparation of monomeric α-cyanoacrylate by the nonaqueous process is greatly facilitated and the yield of monomer is greatly improved when the initial reaction between the formaldehyde and the cyanoacetate is effected in a solution which is maintained at a pH of at least 7 during the reacting, and wherein an acidic polymerization inhibitor is added to the reaction mixture following the azeotropic removal of the water formed during the reacting but before all of the nonaqueous solvent has been removed from the reaction mixture.

The process embodying this invention can be employed for preparing any of the esters of α-cyanoacrylic acid. Thus, any cyanoacetate can be used in practicing the invention. The α-cyanoacrylates which are of greatest utility, particularly from the standpoint of use as adhesive compositions, are the alkyl, cyclohexyl, or phenyl esters of α-cyanoacrylic acid. Consequently, the process is preferably employed using an alkyl cyanoacetate, a cyclohexyl cyanoacetate, or a phenyl cyanoacetate. The alkyl esters are desirably those in which the alkyl group contains from 1 to about 16 carbon atoms, with the lower alkyl esters containing from 1 to 4 carbon atoms being preferred. Thus, for example, the cyanoacetate is preferably methyl cyanoacetate, ethyl cyanoacetate, propyl cyanoacetate, butyl cyanoacetate, cyclohexyl cyanoacetate, or phenyl cyanoacetate, although the higher alkyl cyanoacetates such as palmityl cyanoacetate can be used if desired. The cyanoacetate is reacted with formaldehyde, and in this application the term "formaldehyde" is intended to include formaldehyde itself as well as the polymers thereof such as paraformaldehyde or the like, but is not intended to include aqueous solutions of formaldehyde as typified by Formalin.

The reaction between the cyanoacetate and the formaldehyde to form a polymeric α-cyanoacrylate is readily effected by heating the reactants to a temperature of about 50 to 90° C. in the presence of a basic condensation catalyst. In the process embodying this invention, the reaction is carried out in solution in a nonaqueous organic solvent which has a distilling temperature below the depolymerization temperature of the polymer formed by the reaction. The solvent used can be any of the nonionizable organic solvents which do not affect the course of the reaction. The improved results obtained in accordance with this invention depend in part upon maintaining the reaction solution at a pH of at least 7 during the reaction. This is readily accomplished by employing the basic condensation catalyst in an amount sufficient to maintain the solution at the desired high pH. A large number of basic condensation catalysts are known, and any of such materials can be used to catalyze the reaction and to achieve the desired pH value. Thus, the catalyst can be any basic material, including the inorganic bases such as sodium or potassium hydroxide, ammonia, ammonium hydroxide, as well as the organic bases, the alkali metal alkoxides, such as sodium or potassium methoxide or ethoxide, or similar well known basic material. In practicing the invention, the secondary amines such as piperidine, dimethyl amine, diethyl amine, dibutyl amine, and the like are preferably employed, although such other basic materials as quinoline, isoquinoline, pyridine, lutidine and the like can be employed.

In carrying out the process, an organic solvent which is capable of forming an azeotrope with the water formed during the reaction is introduced into the reaction mixture, whereby the removal of the water by azeotropic distillation is facilitated. The azeotropic solvent can be introduced initially and form the solvent medium for the reaction itself, or it can be introduced initially in admixture with another organic solvent, or it can be introduced into the reaction mixture after the reaction has been effected and prior to the separation of the reaction solvent. In most cases, the solvent which is employed is one which is at least partially miscible with water, although solvents which are immiscible with water can be used in some cases with slightly less advantageous results. Among the reaction solvents which are preferably employed are the monohydric alcohols, and particularly the lower alkyl monohydric alcohols such as methanol, ethanol, propanol, isopropanol, butanol, or the like; aliphatic ethers, and particularly the lower dialkyl ethers such as diethyl ether, diisopropyl ether and the like; benzene, chloroform, cyclohexane, or similar well-known organic solvents which distill at a temperature below the depolymerization temperature of the polymeric α-cyanoacrylate. To remove the water formed during the reaction, benzene and similar solvents which readily form azeotropes with water are desirably employed. They may be the sole solvent for the reaction or, alternatively, they may be added after completion of the reaction to facilitate removal of the water formed. When the solvent employed as the reaction vehicle is not an azeotroping solvent, at least a portion of such solvent can be distilled out of the reaction mixture before addition of the azeotroping solvent if desired.

Following the reaction between the cyanoacetate and the formaldehyde, the water formed during the reaction and only a portion of the nonaqueous solvent are separated from the polymeric product. This separation is readily effected by distilling out a mixture of organic solvent and water from the reaction mixture. Using an azeotrope-forming solvent such as benzene, the reaction solvent, water, and a portion of the benzene can be distilled off as a ternary azeotrope, and the water content of the polymer is reduced to a value of less than 0.4%. When a portion of the reaction solvent is distilled out before addition of the azeotroping solvent, the water formed during the reaction stage remains in the reaction mixture even when the solvent content has been reduced by as much as 80 to 90%. It is necessary, of course, that the azeotrope distill at a temperature below the depolymerization temperature of the polymeric product. In most cases, however, this is not a problem using the volatile organic solvents, since depolymerization is usually effected by heating the polymeric product at a temperature of the order of 95–150° C. under a vacuum of the order of 1 mm. Hg.

In the process of this invention, the resulting substantially anhydrous reaction mixture contains polymeric α-cyanoacrylate admixed with a substantial amount of nonaqueous organic solvent. At this stage, there is added to the reaction mixture an acidic polymerization inhibitor or inhibitors which do not vaporize under the conditions employed for depolymerization of the polymer. The inhibitor added is preferably a mixture of phosphorous pentoxide and hydroquinone, although either of these materials can be added separately, or such other materials as antimony pentoxide, picric acid, tert. butyl catechol, metaphosphoric acid, maleic anhydride, ferric chloride, or the like can be used alone or in admixtures of one or more of such inhibitors. It is necessary that the acidic inhibitor be added to the reaction mixture at this stage wherein the mixture still contains a portion of the organic solvent in order to achieve the improved results of this invention. After the inhibitor has been added, the remainder of the organic solvent is removed from the reaction mixture by distillation or other well known means leaving substantially anhydrous and solvent-free polymeric α-cyanoacrylate admixed with the acidic polymerization inhibitor.

The polymer can then be depolymerized by heating the polymer under reduced pressure whereby monomeric vapors are evolved which can be condensed and collected in a suitable receiving vessel. In the preferred practice of the invention, the monomeric vapors are continually admixed with an acidic gaseous inhibitor, such as sulfur dioxide, nitric oxide, hydrogen fluoride, or the like, which is continuously bled into the system to mix with the vapors. Usually it is desirable to also include a polymerization inhibitor in the receiving vessel wherein the condensed monomer is collected. The gaseous inhibitor dissolves in the monomeric vapors to some extent and remains dissolved in the product after condensation. Phosphorous pentoxide alone or desirably admixed with hydroquinone is preferably employed in the depolymerization vessel, and sulfur dioxide is desirably introduced into the system as the gaseous inhibitor. A particularly stable monomeric product is obtained when the receiving flask contains a small amount of hydroquinone, whereby a monomer composition is obtained which contains a mixture of sulfur dioxide and hydroquinone.

Since the polymers prepared in accordance with this invention melt readily at a temperature of 75–95° C., the process can be readily carried out in continuous fashion. The solvents can be removed from the crude reaction mixture as described, the polymers melted, flowed into a depolymerization vessel, and the depolymerization continuously effected. If desired, however, the process can be carried out batchwise with good results.

The monomeric α-cyanoacrylic esters prepared in accordance with this invention are excellent adhesive compositions for bonding almost any type of material to itself or to a dissimilar material. The use of such compositions as adhesives is described in the copending application of Coover, Serial No. 318,325, filed November 1, 1952. The adhesive compositions are readily employed by merely spreading them in a thin film on the surface to be bonded. Polymerization occurs within a few seconds without the use of either heat or a polymerization catalyst, and the bonds which are obtained are of very high strength.

The advantages of the process embodying this invention are illustrated in the following examples, which are not intended to limit the scope of the invention unless otherwise specifically indicated.

*Example 1*

The process embodying this invention was carried out in the following manner. In a 3-neck 500-ml. round-bottom flask equipped with a mechanical stirrer, thermometer, condenser, capillary tube, graduate separatory funnel, and a Dean-Starke tube were placed 37.5 g. of paraformaldehyde, 124 ml. of methanol, and 0.40 ml. of piperidine. In the Dean-Starke tube was placed 32 ml. of methanol to prevent a significant change in the volume of the reaction mixture while refluxing. In the separatory funnel was placed 123.7 g. of methyl cyanoacetate. The methanolic solution was heated to reflux, and the heat was then turned off. The methyl cyanoacetate was added dropwise at such a rate as to keep the reaction mixture at reflux. The addition required 9 minutes, and the reaction temperature at the end of the addition was 71° C. The pH of the solution was 8.5 at the start of the addition, while the pH was 6.8 at the finish of the addition. A further addition of 0.05 ml. of piperidine raised the pH to 7.0, and 0.05 ml. more raised the pH to 7.2–7.4. At this point, 18.3 g. of tricresyl phosphate was added to facilitate the reaction, and heat was applied. Over a period of 41 minutes, 148 ml. of methanol was distilled off, and the reaction temperature was then 88° C. The heat was turned off, 165 ml. of benzene added, and the remainder of the methanol, as well as the water formed during the reaction, was azeotroped off over a period of 93 minutes. The heat was removed and the solution allowed to cool slightly before adding 5.6 g. of P₂O₅ and 4.2 g. of hydroquinone. The apparatus was then changed for vacuum distillation by removing the condenser, Dean-Starke tube, and separatory funnel. The apparatus was fitted with a simple still head, packed very loosely with a small amount of freshly cleaned copper tinsel which had been rinsed with dilute acetic acid and dried. The remainder of the benzene was then distilled off under a partial vacuum while sulfur dioxide was bled into the system through the capillary. After the benzene had been removed, the system was connected to a mechanical pump and crude monomer was vacuum distilled at 2 mm. pressure over a boiling point range of 80°–190° C. The yield of crude monomer was 133 g. or 98% of theoretical. This crude monomer was then redistilled using a 3-neck flask equipped with a thermometer, capillary for bleeding in sulfur dioxide, a small column loosely packed with freshly prepared copper tinsel, and a fraction cutter. Before redistillation, 0.4% by weight of hydroquinone and 1.0% of phosphorous pentoxide were added to the crude monomer, and the fraction obtained at 66–69° C. and 2 mm. Hg pressure was collected. An 82% yield of redistilled product was obtained, giving an overall yield from the process of 80.3%.

*Example 2*

The advantageous effect of employing a pH of at least 7 is illustrated in this example. The process was carried out exactly as described in Example 1 except that 0.33 ml. of piperidine was added initially, and no additional base was added to the reaction mixture. The pH of the reaction solution after completion of the addition of methyl cyanoacetate was 6.8. The crude monomer which was collected weighed 94.1 g. or 69.3% of theory. After redistillation, a yield of 76% of redistilled product was obtained, giving an overall yield of 52.7% of theory. This is in contrast to the overall yield of 80.3% obtained in the process embodying this invention as described in Example 1.

*Example 3*

The basic condensation catalyst is preferably added in a sufficient amount initially to maintain the required high pH after addition of the α-cyanoacetate without a further addition of base after such addition. Thus the process of Example 1 was repeated using 0.50 ml. of piperidine in the methanolic solution at the start of the addition of methyl α-cyanoacetate. The pH of the solution before addition of the α-cyanoacetate was 8.2, and the pH of the final reaction mixture was 7.0–7.2. Using the process as described, a yield of crude monomer of 136 g. (100% of theory) was obtained. Redistillation of the crude monomer gave a yield of 78% of pure monomer. The overall yield was thus 78%.

*Example 4*

This example illustrates the necessity of adding the acidic polymerization inhibitor to the reaction mixture before removal of all of the solvent. The process described in Example 3 was repeated with the exception that the hydroquinone and the phosphorous pentoxide were not added to the polymeric α-cyanoacrylate until after the benzene had been entirely removed under vacuum. In this case, the polymer decomposed with some foaming, and no monomer was obtained.

It is apparent from the foregoing examples that the reaction mixture must be above a pH of 7 in order to obtain a complete reaction of the reactants and give a near quantitative yield of crude monomer. Furthermore, the acidic polymerization inhibitor must be added after the water has been removed by azeotroping but before all of the solvent is removed from the polymer in order that the polymer can be depolymerized and not decomposed by the vacuum distillation. Thus the process employing nonaqueous reaction conditions and azeotropic removal of water, when combined with the pH conditions and the addition of polymerization inhibitor at the stage described, gives very high yields of monomeric α-cyanoacrylate of high purity. Similar results are obtained using other cyanoacetates including cyclohexyl cyanoacetate, phenyl cyanoacetate, and the other alkyl cyanoacetates as defined herein with formaldehyde itself or with paraformaldehyde or other material furnishing formaldehyde under the reaction conditions. Furthermore, other basic condensation catalysts can be used as described with equally good results. The monomeric product obtained is of excellent quality and has a high degree of stability in bulk. The advantages inherent in the nonaqueous process on which this is a specific improvement are retained in the process embodying this invention, and, in addition, the yield of product is greatly improved. The process is also facilitated when employing this invention since the foaming of the reaction mixture during removal of the solvent is reduced.

The invention has been described in considerable detail with particular reference to certain preferred embodiments thereof, but it will be understood that variations and modifications can be effected within the spirit and scope of the invention as described hereinabove and as defined in the appended claims.

I claim:

1. The method which comprises reacting formaldehyde with a cyanoacetate of the formula $$NC—CH_2—COOR$$

wherein R is a member of the group consisting of alkyl, cyclohexyl and phenyl groups, to form a polymeric α-cyanoacrylate, said reacting being effected by heating to a temperature of about 50 to 90° C. at a pH of at least 7 a solution of said cyanoacetate, said formaldehyde and a basic condensation catalyst in a non-aqueous organic solvent which distills below the depolymerization temperature of said polymeric α-cyanoacrylate, azeotropically separating water formed during the reaction from said polymeric α-cyanoacrylate while maintaining a substantial amount of non-aqueous organic solvent admixed with said polymeric α-cyanoacrylate, adding a polymerization inhibitor to said polymeric α-cyanoacrylate admixed with non-aqueous organic solvent, thereafter separating said non-aqueous solvent from said polymeric α-cyanoacrylate, and depolymerizing the resulting substantially anhydrous and solvent-free polymeric α-cyanoacrylate.

2. The method which comprises reacting formaldehyde with a cyanoacetate of the formula $$NC—CH_2—COOR$$

wherein R is a member of the group consisting of alkyl, cyclohexyl and phenyl groups, to form a polymeric α-cyanoacrylate, said reacting being effected by heating to a temperature of about 50 to 90° C. at a pH of at least 7 a solution of said cyanoacetate, said formaldehyde and a basic condensation catalyst in a non-aqueous organic solvent which distills below the depolymerization temperature of said polymeric α-cyanoacrylate, separating water formed during the reacting by introducing into the reaction mixture prior to said separating a non- aqueous azeotrope-forming organic solvent and azeotropically distilling said water from the reaction mixture, maintaining a substantial amount of non-aqueous organic solvent in said reaction mixture after removal of said water is completed, adding to said reaction mixture an acidic polymerization inhibitor, thereafter separating out the non-aqueous organic solvent remaining in said reaction mixture, and depolymerizing the resulting substantially anhydrous and solvent-free polymeric α-cyanoacrylate.

3. The method which comprises reacting formaldehyde with a cyanoacetate of the formula $$NC—CH_2—COOR$$

wherein R is a member of the group consisting of alkyl, cyclohexyl and phenyl groups, in the presence of a sufficient amount of a basic condensation catalyst to maintain the reaction mixture at a pH of at least 7 during said reacting, said reacting being effected by heating at a temperature of about 50 to 90° C. a solution of said formaldehyde, said cyanoacetate and said basic condensation catalyst in a non-aqueous organic solvent which distills below the depolymerization temperature of polymeric α-cyanoacrylate, adding to the reaction mixture an organic solvent effective to form an azeotrope with water formed during said reacting, azeotropically distilling said water from the reaction mixture while maintaining a portion of the organic solvent in the reaction mixture, adding an acidic polymerization inhibitor to the reaction mixture, separating the remaining organic solvent from the reaction mixture and depolymerizing the polymeric α-cyanoacrylate containing said polymerization inhibitor admixed therewith.

4. The method which comprises reacting formaldehyde with a cyanoacetate of the formula

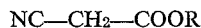
NC—CH₂—COOR wherein R is a member of the group consisting of alkyl, cyclohexyl and phenyl groups, in the presence of a sufficient amount of a basic condensation catalyst to maintain the reaction mixture at a pH of at least 7 during said reacting, said reacting being effected by heating at a temperature of about 50 to 90° C. a solution of said formaldehyde, said cyanoacetate and said basic condensation catalyst in an aliphatic monohydric alcohol which distills below the depolymerization temperature of polymeric α-cyanoacrylate, adding to the reaction mixture an organic solvent effective to form an azeotrope with water formed during said reacting, azeotropically distilling said water from the reaction mixture while maintaining a portion o fthe organic solvent in the reaction mixture, adding an acidic polymerization inhibitor to the reaction mixture, separating the remaining organic solvent from the reaction mixture and depolymerizing the polymeric α-cyanoacrylate containing said polymerization inhibitor admixed therewith.

5. The method which comprises reacting formaldehyde with a cyanoacetate of the formula

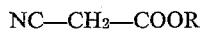
NC—CH₂—COOR wherein R is a member of the group consisting of alkyl, cyclohexyl and phenyl groups, in the presence of a sufficient amount of a basic condensation catalyst to maintain the reaction mixture at a pH of at least 7 during said reacting, said reacting being effected by heating at a temperature of about 50 to 90° C. a solution of said formaldehyde, said cyanoacetate and said basic condensation catalyst in a non-aqueous organic solvent which distills below the depolymerization temperature of polymeric α-cyanoacrylate, adding to the reaction mixture an organic solvent effective to form an azeotrope with water formed during said reacting, azeotropically distilling said water from the reaction mixture while maintaining a portion of the organic solvent in the reaction mixture, adding an acidic polymerization inhibitor comprising phosphorous pentoxide to the reaction mixture, separating the remaining organic solvent from the reaction mixture and depolymerizing the polymeric α-cyanoacrylate containing said polymerization inhibitor admixed therewith.

6. The method which comprises heating to about 50 to 90° C. a solution, in a lower alkyl monohydric alcohol, of an alkyl cyanoacetate, formaldehyde, and a basic condensation catalyst in an amount sufficient to maintain said solution at a pH of at least 7, and thereby forming a polymeric alkyl α-cyanoacrylate, adding benzene to the reaction mixture, azeotropically separating from the reaction mixture a ternary azeotrope of said alcohol said benzene and water formed during the reaction, maintaining a portion of said benzene in the reaction mixture following the separation of said azeotrope, adding to the reaction mixture phosphorous pentoxide and hydroquinone, separating the remaining benzene from the reaction mixture, and depolymerizing said polymeric α-cyanoacrylate having said phosphorous pentoxide and said hydroquinone admixed therewith by heating said polymeric α-cyanoacrylate to depolymerization temperature.

7. The method which comprises reacting p-formaldehyde with a lower alkyl cyanoacetate to form a polymeric α-cyanoacrylate by heating at a temperature of about 50–90° C. a solution of said p-formaldehyde, said cyanoacetate and a secondary amine in a non-aqueous organic solvent having a distilling temperature below the depolymerization temperature of said polymeric α-cyanoacrylate, said secondary amine being present in an amount sufficient to maintain said solution at a pH of at least 7 during said reacting, azeotropically distilling water formed during said reacting from the reaction mixture while maintaining said polymeric α-cyanoacrylate admixed with a substantial amount of nonaqueous organic solvent, adding to the resulting substantially anhydrous polymeric α-cyanoacrylate admixed with non-aqueous organic solvent an acidic polymerization inhibitor incapable of vaporization at the depolymerization temperature of said polymeric α-cyanoacrylate, thereafter removing the remainder of the nonaqueous organic solvent from said polymeric α-cyanoacrylate, and depolymerizing the resulting substantially anhydrous and solvent-free polymeric α-cyanoacrylate containing said polymerization inhibitor.

8. The method which comprises heating to a temperature of about 50–90° C. a solution, in a lower alkyl monohydric alcohol, of p-formaldehyde, a lower alkyl cyanoacetate and a dialkyl amine in an amount sufficient to maintain said solution at a pH of at least 7, and thereby forming a polymeric α-cyanoacrylate, adding benzene to the resulting reaction mixture, azeotropically distilling from the reaction mixture said alcohol, water formed during said reacting, and a portion of said benzene to give a substantially anhydrous polymeric α-cyanoacrylate admixed with a substantial amount of benzene, adding to this mixture phosphorous pentoxide and hydroquinone, distilling the remaining benzene from the mixture leaving polymeric α-cyanoacrylate containing phosphorous pentoxide and hydroquinone, and depolymerizing said polymeric α-cyanoacrylate, said depolymerizing being effected by heating said polymeric α-cyanoacrylate under reduced pressure in the presence of said phosphorous pentoxide and said hydroquinone and thereby evolving vapors of monomeric α-cyanoacrylate and admixing said vapors with a gaseous acidic polymerization inhibitor.

9. The method which comprises heating to a temperature of about 50–90° C. a solution, in methanol, of p-formaldehyde, methyl cyanoacetate and piperidine in an amount sufficient to maintain said solution at a pH of at least 7 during the reacting, and thereby forming polymeric α-cyanoacrylate, adding benzene to the reaction mixture following the reacting, azeotropically distilling from said reaction mixture a ternary azeotrope of said methanol, water formed during the reaction, and a portion of said benzene, adding phosphorous pentoxide and hydroquinone to the reaction mixture containing the remainder of said benzene, distilling the remainder of said benzene from said reaction mixture to give a mixture of polymeric α-cyanoacrylate, phosphorous pentoxide and hydroquinone, depolymerizing said polymeric α-cyanoacrylate by heating it to depolymerization temperature under reduced pressure and thereby causing evolution of monomeric α-cyanoacrylate vapors, and admixing said vapors with sulfur dioxide.

10. The method which comprises heating to a temperature of about 50–90° C. a solution, in methanol, of p-formaldehyde, methyl cyanoacetate and piperidine in an amount sufficient to maintain said solution at a pH of at least 7 during the reacting, and thereby forming polymeric α-cyanoacrylate, adding tricresyl phosphate to the reaction mixture following the reacting, removal of a portion of the said methanol, adding benzene to the reaction mixture, azeotropically distilling from said reaction mixture a ternary azeotrope of said methanol, water formed during the reaction, and a portion of said benzene, adding phosphorous pentoxide and hydroquinone to the reaction mixture containing the remainder of said benzene, distilling the remainder of said benzene from said reaction mixture to give a mixture of polymeric $\alpha$-cyanoacrylate, tricresyl phosphate, phosphorous pentoxide, and hydroquinone, depolymerizing said polymeric $\alpha$-cyanoacrylate by heating it to depolymerization temperature under reduced pressure and thereby causing evolution of monomeric $\alpha$-cyanoacrylate vapors, and admixing said vapors with sulfur dioxide.

No references cited.